United States Patent [19]

Morse

[11] Patent Number: 4,951,169
[45] Date of Patent: Aug. 21, 1990

[54] SAFETY DEVICE FOR AN ELECTRICAL APPLIANCE

[76] Inventor: Milton Morse, 1 Horizon Rd., Fort Lee, N.J. 07024

[21] Appl. No.: 310,225

[22] Filed: Feb. 13, 1989

Related U.S. Application Data

[63] Continuation-in-part of Ser. No. 260,453, Oct. 20, 1988.

[51] Int. Cl.⁵ .............................................. H02H 3/16
[52] U.S. Cl. ..................................... 361/42; 361/178; 307/118; 307/326
[58] Field of Search ........................... 361/1, 42, 178; 307/116, 118, 326

[56] References Cited

U.S. PATENT DOCUMENTS

| | | | |
|---|---|---|---|
| 4,464,582 | 8/1984 | Aragaki et al. | 307/118 |
| 4,709,293 | 11/1987 | Gershen et al. | 361/42 X |
| 4,734,822 | 3/1988 | Gilardori et al. | 361/42 |
| 4,791,519 | 12/1988 | Madsen | 361/42 |

Primary Examiner—Derek S. Jennings
Attorney, Agent, or Firm—Arthur L. Plevy

[57] ABSTRACT

A safety device adapted for use in a hand held tool for minimizing electrical shock from an AC power supply to a user includes a gound plane disposed inside the electrical tool, which, should the tool become immersed in water or become unreasonably wet, provides a path for electrical current, which energizes a solenoid which, in turn, disconnects the AC power supply. The safety device is encased in a cartridge or module. The safety device contains a power supply, such as a electret and/or a battery, that is independent of the AC power supply. Thus, the safety device can be tripped even if the tool is not plugged in or turned on.

22 Claims, 3 Drawing Sheets

SAFETY DEVICE FOR AN ELECTRICAL APPLIANCE

BACKGROUND OF THE INVENTION

This application is a continuation-in-part of a "SAFETY" device for an electrical appliance given Ser. No. 07/260,453, filed Oct. 20, 1988, and is co-pending therewith.

This invention relates, generally, to appliances and, more particularly, to appliances such as electric hair dryers, curling irons, kitchen appliances and the like which include a means for disconnecting the electrical current therein should the device become saturated with water or for any other reason where a shock hazard exits.

The usage of consumer appliances in present day households is increasing. There are many types of devices, particularly handheld types, which generally fall into three categories: health and beauty, kitchen and electric hand tools. Health and beauty handheld electrical devices are generally comprised of electric hair dryers, curling irons, electric razors; kitchen devices are generally include mixers, blenders, coffee makers, etc.; while handheld electric tools are generally include comprised of drills, hedge-clippers, handheld saws and the like.

The reasons for the proliferation of these devices is quite simple. They are generally inexpensive to purchase, while being convenient and well adapted to their individual purpose. However, use of these devices produces a distinct danger, particularly when used around water, or even steel wool pads. This danger is in the form of electrocution. Frequency of electrocution as a result of these types of devices, particularly handheld electric hair dryers, is increasing. Since these types of devices are typically used in wet areas, such as sinks or, tubs, it is readily apparent that there is a significant likelihood that the object will either be dropped into water, or that it may become contaminated with water, such as by a splash of water when clipping shrubbery due to moisture present on the grass, adjacent foundations or the like.

Presently, ground faulting interrupters are being used in new and renovation construction, which are expressly for the purpose of minimizing the chances of electrocution. However, these types of devices have not been integrated into existing housing, which comprises the bulk of usage areas. Hence, safety is a problem from place to place and not merely between devices Another significant and distinct disadvantage, regardless of whether conventional ground faulting detectors are being utilized, is that fault current must generally flow through the user before the device detects and interrupts the flow of current therethrough. A further disadvantage is in the situation where there are no conventional ground fault interrupters and a separate interrupter is utilized with the device. Generally, conventional ground fault interrupters are somewhat bulky and cumbersome due to the fact that they not only detect and interrupt the flow of ground fault current, but also have user accessible test and reset buttons. This therefore drives up the cost and size requirements of any device wishing to utilize current interrupters.

Yet another disadvantage is that encompassing a standard ground fault interrupter into a handheld electrical device, such as a hair dryer or the like, requires that the case or housing must be specifically designed or re-engineered in order to accommodate the components. Therefore, new molds must be made at considerable time and expense, and the outer profile of the handheld device must necessarily be changed.

Accordingly, it is an object of the present invention to provide a current path in a handheld electrical device which allows a current interruption device to operate more quickly.

It is a further object of the present invention to provide a current path in an electrically powered handheld device which avoids leakage current paths through the user of the device.

It is yet another object of the present invention to produce a hand held device which incorporates a current interruption mechanism as an integral part thereof.

Yet another object of the present invention is to produce a handheld electrical device having a current interruption mechanism integral therein, which when tripped, can only be reset by a special tool.

A still further object of the present invention is to produce a handheld electrical device having a current interrupting mechanism integral therein which is resettable only after inspection by a trained service person.

Yet another object of the present invention is to produce a handheld electrical device having an interrupting safety mechanism which is inexpensive to manufacture.

Another object of the present invention is to produce a device which adds few additional components and is easy to assemble.

Still a further object of the present invention is to produce a current interruption mechanism which is small and compact and may also fit into existing housing configurations and sizes of hand held devices.

Yet another object of the present invention is to produce a safety device which is retrofittable to existing designs.

Still another object of the present invention is to produce a safety device which will automatically and completely electrically disconnect the line cord from any interior components in the hand held device when an electrically hazardous condition exists.

Another object is to hermetically seal all electrical interconnections with the line cord and the safety device.

It is also another object of the present invention to produce a safety mechanism which is in the form of a module which is extremely compact. A further object is to produce an invention which may fit into existing casings of handheld devices and which does not necessitate additional engineering, retooling, molding, and the like.

Still another object is to produce a mechanism which does not require the change or enlargement of the outer profile of the case of the handheld electrical device.

Yet another object of the present invention is to produce a standard-size mechanism which may be purchased by any manufacturer and which may therefore be usable with any presently existing or future handheld electrical devices.

Another object of the present invention is to produce a mechanism having an electrical path for driving a load therein which comprises a ground plane disposed within the device in order to provide an electrical path, a detector with an input for detecting the presence of electrical current in the ground plane and an output for producing an electrical signal after detection of the presence of electrical current in the ground plane, and a current interrupter which has an input adapted to receive the output of the detector and an output for interrupting the electrical path in the device.

Another object of the present invention is to produce a current interruption mechanism for an electrical device having a first electrical path for driving a load, such as a heating coil, and an alternate ground path, and comprising a ground plane disposed within the electrical device for providing an electrical ground path; a detector disposed within the electrical device, comprising a gate having a biasing lead for detecting the presence of electrical current in the ground plane, an input connected to the first electrical path, and an output and an output lead thereat for producing an electrical signal proportional to the current in the ground path; a current interruption device disposed within the electrical device, having an input adapted to receive the electrical signal of the output lead, and an output for interrupting the first electrical path in the electrical device; and an electrical storage device in series circuit relationship with the output lead.

Yet another object is to energize the current interruption device, such as a solenoid, with an electrical storage device connected in series circuit relationship with the output lead and the current interruption device.

Finally, another object of the invention is to provide a detachable safety cartridge for a handheld electrical device wherein the electrical device has a first electrical path for driving a load therein an alternate ground path, the cartridge comprising a module disposable within a handheld electrical device for interrupting the flow of electrical current in the first electrical path in response to detecting current in the alternate ground path.

BRIEF DESCRIPTION OF THE DRAWINGS

Reference may now be had to the accompanying drawings in which.

DETAILED DESCRIPTION OF THE PREFERRED EMBODIMENT

Figure 1:
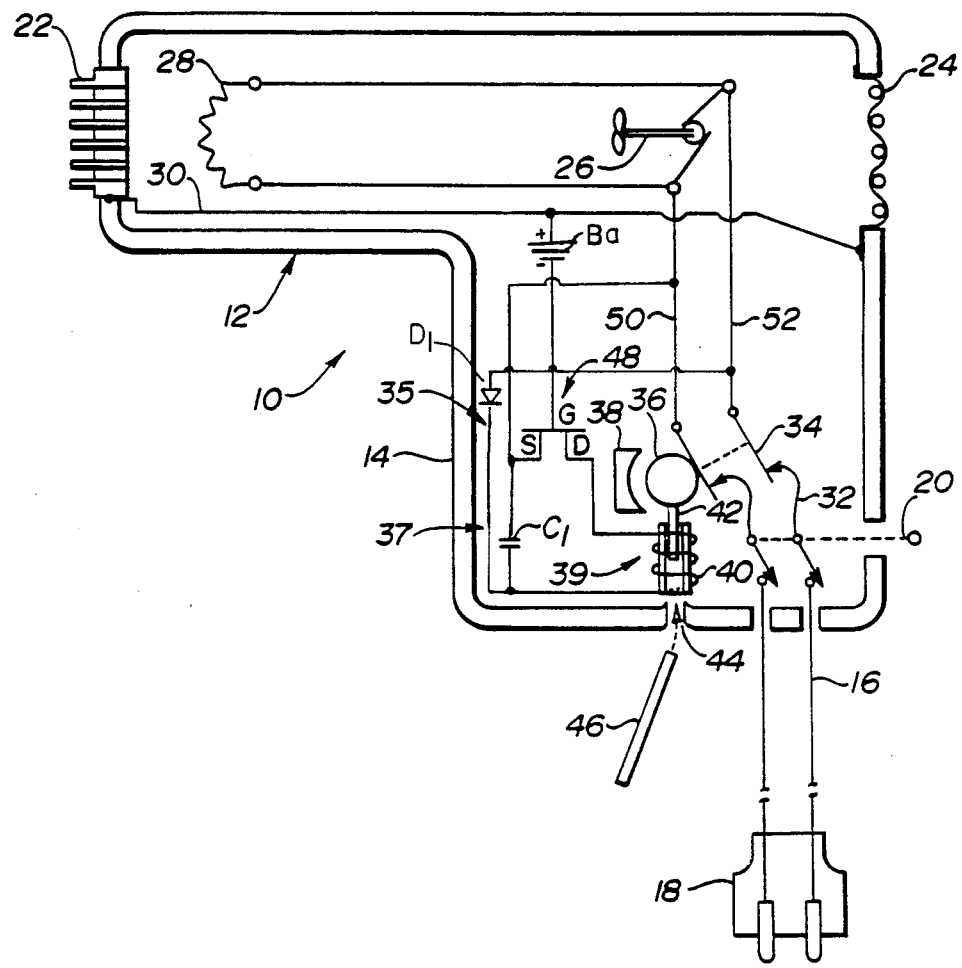
FIG. 1 is a representational view of an electric handheld hair dryer incorporating the present invention.

Referring now to FIG. 1, there is shown a diagrammatic view of the device encompassing the preferred embodiment of the present invention. Shown is an electric handheld hair dryer 10. It is to be understood that other types of handheld electric devices can and may be used without departing from the spirit and scope of the present invention such as, for example, electric curling irons, hand tools and the like. The hair dryer is comprised of a barrel 12 and handle 14 housing a number of components therein. At one end of handle 14 is an electric cord 16 which terminates at plug 18 and is suitable for typical household use. An ON/OFF lever 20 is disposed at the base of handle 14 and may be of any suitable type such as slide, rotary or the like and may be single pole, double pole or any other suitable or desired configuration. At one end of barrel 12 is a front grill 22 which permits the passage of heated air therethrough as described more fully below. A screen 24 is typically located at the rear end of barrel 12 and utilized so that foreign matter, i.e., hair, cannot be sucked into barrel 12. A blower motor 26 or fan is generally disposed adjacent to the screen 24 and takes air in through screen 24 and passes air over heating element 28. Heating element 28, in turn, heats the air before the air exits through the front grill 22. A ground screen or plane 30 is used to electrically connect front grill 22 to screen 24. Further, screen/plane 30 provides a continuous electrical path throughout the interior of hair dryer 10. By ground screen/plane 30 is meant any electrically conductive means to direct the current to a current interrupter device 35 and, therefore, the ground plane 30 is not necessarily at earth "ground" potential. In this manner, should hair dryer 10 fall into water or should hair dryer 10 become wet to an unacceptable level, a ground path is provided between electrically conductive "live" areas in the hair dryer and the ground screen. The electrical connection between grill and screen 22 and 24 respectively via a ground screen/plane 30 may be accomplished in any number of suitable ways, such as crimp type fits, compression type fits, soldering or welding to mention a few. Any of the live areas can and may include exposed portions of hot or neutral wires 50, 52 respectively, portions of heating element 28 or blower motor 26 as well as portions of ON/OFF switch 32 having load contacts 34 therein.

It has been determined that the ground screen/plane 30 may be in a number of embodiments or configurations, although all are acceptable as long as a continuous electrically conductive ground path is provided. Accordingly, the ground screen/plane 30 may be in the form of a metal screen, or plating disposed on the interior portions of hair dryer 10, or on one side of heating insulators (not shown) which are typically disposed in barrel 12, and may be fabricated from aluminum or other type of metal foil. In this manner, an alternate current return path is readily available between any of the electrically "live" components inside hair dryer 10 (as previously discussed) through water and hence to ground screen/plane 30. It has been found that this provision of an alternate return or ground path minimizes or eliminates the chance of current flow through a user, particularly when the dryer 10 merely has too much water present such as having water splashed on to it as it lies adjacent a sink or, in the case of a hand tool, it is laid down or adjacent to a puddle.

It has been found that the provision of a ground screen/plane 30 provides another distinct and significant advantage in that present hair dryer or appliance design need not be changed from two conductor to three conductor cord sets (not shown) since present designs are most cost sensitive. For this reason I have found that provision of an interrupt device 35, which is contained directly in handle 14, is appropriate. The interrupt device 35 is generally comprised of two portions: an electronic components portion 37 and a mechanical interlock portion 39. The function of the electronic component portion 37 is to detect and utilize electrical energy passing through or present on ground screen/plane 30. The mechanical interlock 39 is used to physically disconnect incoming power via electric cord 16 to the remainder of hair dryer 10.

The electronic components 37 include field effect transistor (FET) 48 having its gate terminal (G) connected to a terminal of biasing battery $B_a$, with the remaining lead of the battery $B_a$ connected to ground screen/plane 30. Therefore, the biasing battery $B_a$ will render the FET 48 conductive in the event of any current leakage between ground screen/plane 30 and elsewhere in the device 10. Battery $B_a$, a lithium, or hearing-aid type or other long shelf life battery, may be utilized to provide an internal power supply which would cause mechanical interlock 39 to be energized regardless of whether plug 18 has power applied thereto, should the hair dryer be immersed and present during a shock hazard or the like. Therefore, when plug 18 is energized, the interrupt device 35 would have been previously tripped and no chance of electrical short or the like can be applied to the user.

Source terminal (S) of FET 48 is connected to hot lead 50 and to one terminal of condenser C1. The remaining terminal of condenser C1 is connected to one terminal of coil 40 and to the cathode of diode D1. The remaining terminal of diode D1 is connected to neutral lead 52. The drain terminal (D) of FET 48 is connected directly to the remaining terminal of coil 40. A person skilled in the art can appreciate the substrate of FET 48 must be connected such that the battery $B_a$ provides a signal to the gate whenever the ground plane 30 is electrically connected to either lead 50 or 52.

Coil 40 is preferably a "latch" type solenoid coil having a movable rod 42 disposed therein. In the preferred embodiment of the present invention, movable rod 42 is either an integral part of or connected to ball 36. Therefore, energization of coil 40 causes ball 36 to be urged downward. However, it is to be understood that rather than rod 42 pulling ball 36 downward, similar satisfactory results may be obtained by having rod 42 merely push ball 36 upward. A stop 38 is provided to maintain ball 36 in a stationary position with ball 36 being used to bias spring-type load contacts 34 against appropriate terminals of ON/OFF switch 32. In this manner, when rod 42 is urged downward, due to electromotive force present in coil 40, ball 36 is similarly urged downwards with the result that load contacts 34 will electrically and mechanically disconnect from the contacts of ON/OFF switch 32.

Therefore, when the dryer 10 is operative, and when current exists between ground screen 30 and hot wire 50 (or neutral wire 52), current will be permitted to flow through the drain-source path of the FET 48 with the result that coil 40 will be energized. Accordingly, in the preferred embodiment of the present invention, a ground fault in the traditional sense is not required in order to "trip" the present invention and prevent user injury. Rather, a current between ground screen/plane 30 and any electrically live component, such as is present during a shock hazard, will be detected and will result in operation of interrupt device 35. This shock hazard may be the result of immersion, high humidity, steel wool used during cleaning, or as a result of damage. Such damage may occur when, for example, a user tries to clean a toaster by using a knife and causes a short therein.

In this manner, the "user" is not required to be the electrical return path in a circuit and hence subject to shock before the device will trip. Another significant advantage of battery $B_a$ in this type of circuit operation is that even if plug 18 is not energized, that is in a receptacle, the battery $B_a$ supplies the power to enable the interrupt device 35 to function. As can be ascertained from FIG. 1, a signal applied to the gate of FET 48 causes the FET 48 to conduct along its drain-source path, thereby allowing condenser C1 to energize the coil 40. Consequently, when the hair dryer 10 is eventually plugged in, the interrupt device 35 has already been tripped, and thus there will be no chance of a shock hazard.

When tripped, rod 42 will, as previously mentioned, preferably be urged downward. Further, in the preferred embodiment of the present invention, rod 42 is of an appropriate length such that after tripping it cannot and will not emerge through reset aperture/keyway 44 present in the underside of handle 14. In the preferred embodiment of the present invention, return of rod 42 to the normal position which enables load contacts 34 to be energized, cannot be accomplished except by use of reset key 46. Accordingly, reset key 46 must be passed through reset aperture/keyway 44 in order to properly reorient rod 42. Preferably, keyway 44 and hence reset key 46 are of a cross-type configuration. In this manner, reset may only be accomplished by an individual having the correct reset key 46. Accordingly, it is preferred that only qualified service individuals be given a reset key, thereby adding an extra level of safety. Should interrupt device 35 trip, the user would be required to bring the dryer 10 to any service center having qualified technicians who will then examine hair dryer 10 to ensure that the interior is dry, there are no damaged components, frayed wires or extraneous matter or the like, before the resetting of interrupt device 35.

Additionally, in the preferred embodiment of the present invention, it is preferred that load contacts 34 and ON/OFF switch 32 be at least moisture proof and preferably waterproof. Therefore, should a hair dryer 10 be immersed in water, water cannot flow into the switch 32 which might permit a flow of current through switch 32 to load contacts 34 at any time. Alternately, in the present invention, a reset aperture/keyway is not utilized. Therefore, a trained service technician must open up the hair dryer 10 to physically inspect the interior thereof and to effectuate reset of mechanical interlock 39.

Further, in the preferred embodiment of the present invention, condenser C1 is an electret which is well known and understood by one skilled in the art. An electret is highly desirable since it retains a charge, absent outside electrical stimulation. In this regard, it is not necessary for condenser C1 to build a charge prior to energization of coil 40. Since the electret retains its own charge, quick energization of coil 40 is inherent. Hence, when the dryer 10 is operative, the condenser C1 cuts down significantly on the interrupt time of mechanical interlock 39. This is especially important since electromagnets, such as coil 40, typically have a relatively "long" energization time when viewed in terms of the time required for an electrical hazard to harm an individual. For this reason, a fast-acting FET is preferred. Additionally, should it be desired, a transient filter (not shown) may be inserted in series circuit relationship between the source terminal of FET 48 and the electrical connection to the ground screen/plane 30 should nuisance trips be a concern or a problem.

Figure 2:
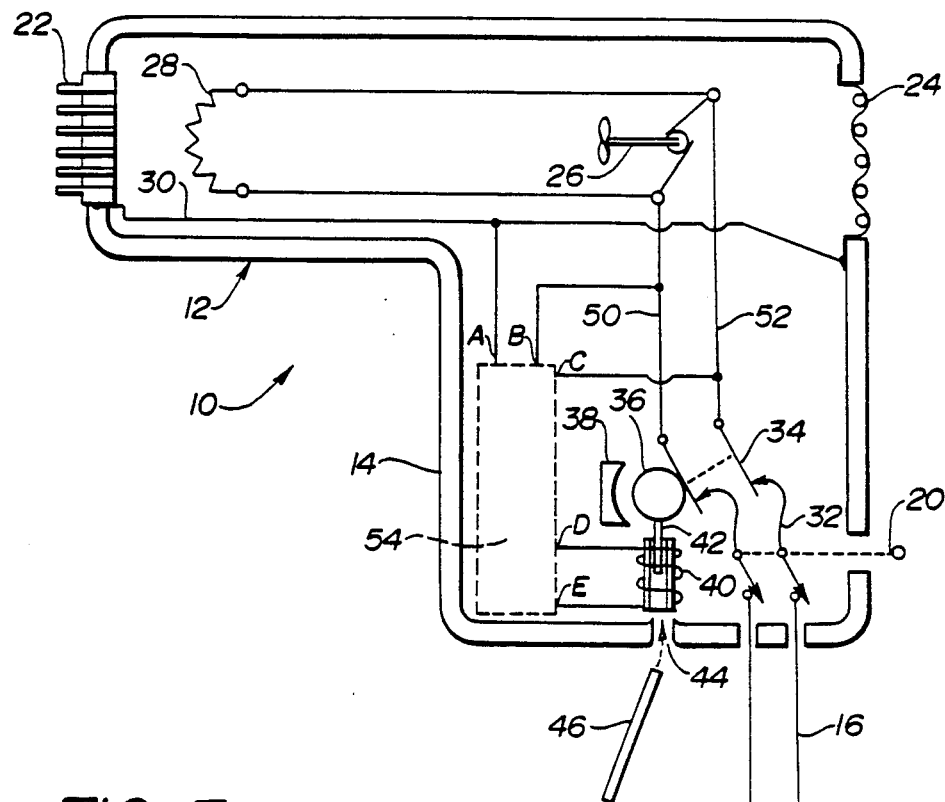
FIG. 2 is a view substantially identical to FIG. 1 illustrating alternate current interruption mechanisms.

Referring now to FIG. 2, a view substantially similar to FIG. 1 is shown. Accordingly, only the differences between FIGS. 1 and 2 will be explained herein. Shown is trigger mechanism 54 which has a number of electrical appliances connected thereto. Ground screen/plane 30 is connected via terminal A to trigger mechanism 54 while similarly terminals D and E of trigger mechanism 54 are respectively connected to coil 40. Terminal B is connected to the hot lead 50 while terminal C is connected to neutral lead 52, although, for the reasons previously mentioned, terminals B and C may be reversed. Accordingly, trigger mechanism 54 may encompass a variety of different components or alternate embodiments.

Figure 3:
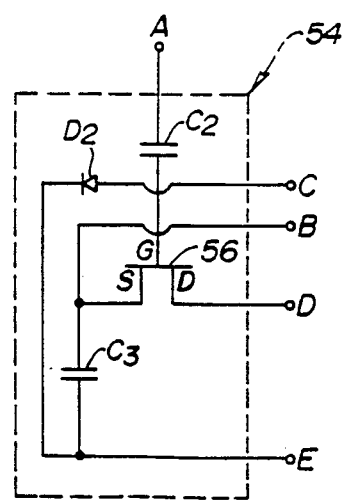
FIGS. 3 and 4 show two alternate circuit configurations for effecting current interruption.
Figure 4:
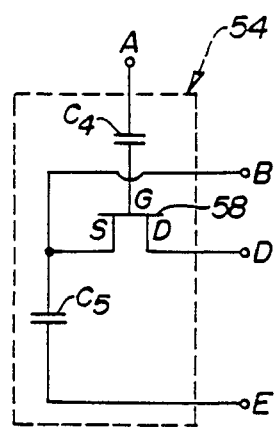

Accordingly, referring now to FIGS. 3 and 4, schematic representations of alternate embodiments of the present invention may be viewed. More particularly, trigger mechanism 54, as shown in FIG. 3, would supplant electronic components 37 disposed in Figure while similarly trigger mechanism 54 of FIG. 4 would supplant electronic components 37 of FIG. 1. Referring to FIG. 3, terminal A and hence ground screen/plane 30 is connected to one terminal of condenser C2. The remaining terminal of condenser C2 is connected to the gate terminal of FET 56. The drain terminal of FET 56 is connected to terminal D or one terminal of coil 40. Hot lead 50, terminal B, is connected to the source terminal of FET 56 and to one terminal of condenser C3. The remaining terminal of condenser C3 is connected to the remaining lead of terminal E and hence, coil 42 and also to the cathode of diode D2. The anode of diode D2 is connected to terminal C, neutral lead 52. It is preferred that condensers C2 and C3 be electrets, thereby providing a certain amount of bias to FET 56 and coil 42 for the purpose of decreasing the "trip time" of mechanical interlock 39. Thus, by comparing FIGS. 1 and 2, one can ascertain that the battery $B_a$ is replaced by electret C2. Additionally, by connecting to neutral lead 52, one half-cycle of delay time is eliminated since alternating current is utilized and hence lead 52 is at a high potential when lead 50 is at a low potential.

FIG. 4 performs in a manner similar to that of FIG. 3 but is, of course, somewhat simpler. There, terminal A is connected to one terminal of condenser C4 while the remaining terminal of condenser C4 is connected to the gate terminal of FET 58. The drain terminal of FET 58 is connected to the D terminal while the source terminal of FET 58 is connected to terminal B and to one terminal of condenser C5. The remaining terminal of condenser C5 is connected to terminal E. As before, it is preferred that condensers C4 and C5 be electrets, thereby shortening the interrupt time.

Figure 5:
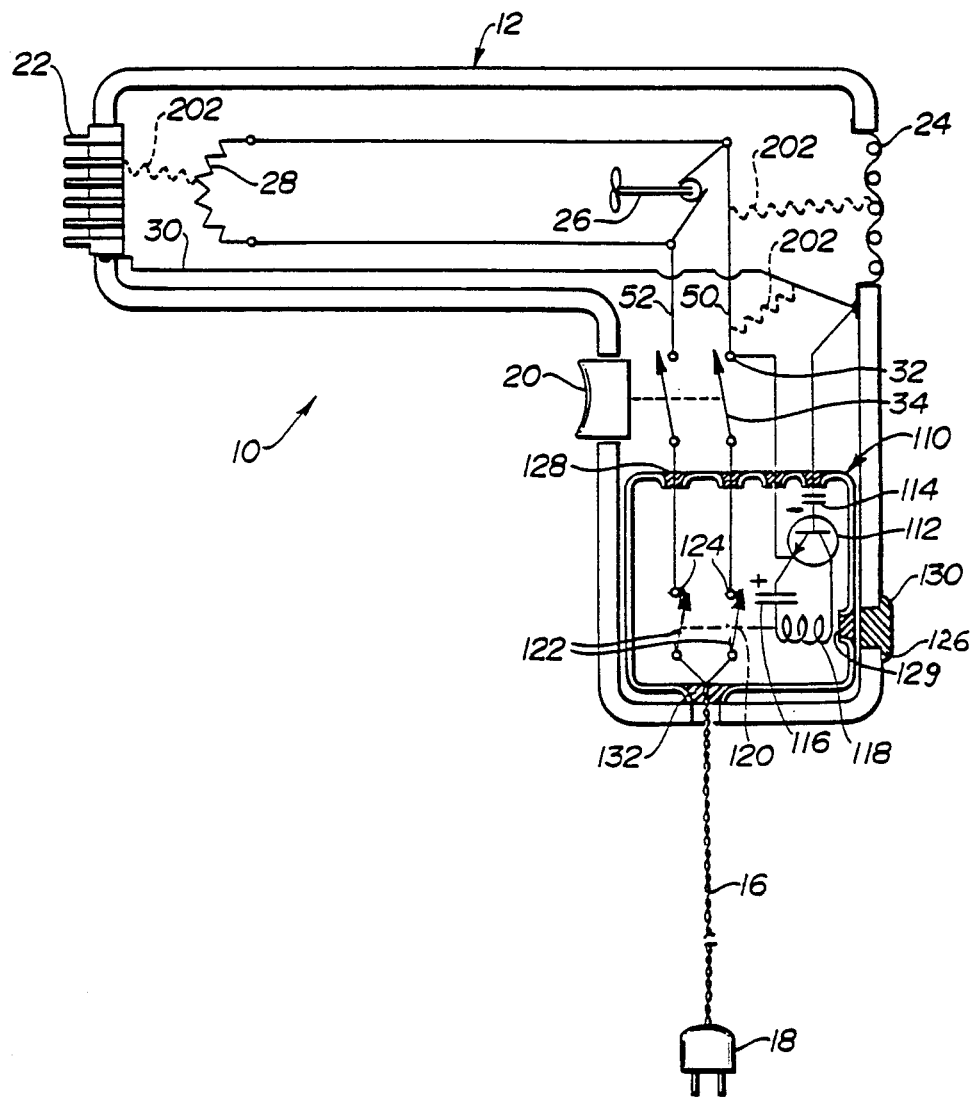
FIG. 5 shows an additional circuit configuration for effecting current interruption using a module approach.

Referring now to FIG. 5, another alternate embodiment is shown. Accordingly, only the differences between FIGS. 1 and 5 will be explained herein. Shown is safety cartridge 110 which is preferably a "module" containing the components indicated therein. By safety cartridge 110 is meant the enclosure of the electrical and/or mechanical components or interlock of the present invention into a package. Therefore, the detection and current interruption portions may be packaged in a single enclosure (or separately) either in a case, or encapsulated, or any other similar means for manufacturing purposes. It is preferred, although not absolutely necessary, that safety cartridge 110 be sealed so as to be waterproofed, such as by hermetic sealing or encapsulation or the like. Therefore, the cartridge 110 may be a off-the-shelf item which is readily distributed to manufacturers of handheld electrical devices. Disposed within safety cartridge 110 is current interruption circuitry, that would make the module perform the same function as electronic and mechanical components 37, 39 previously described.

Readily apparent when viewing FIG. 5 is that due to the preferred encapsulation of the cartridge 110 and its position between the line cord 16 and the on/off switch 20, all components in the hand held device 10 are automatically and electrically isolated from the line cord 16. It has been found that this arrangement offers significant safety advantages over previously known designs.

Here, sensing electret 114 has one terminal connected to ground screen/plane 30 and the remaining terminal connected to the base terminal of a bipolar NPN transistor 112. It is understood that an PNP transistor, and FET or any other type of electronic triggering or gating device may be utilized without departing from the spirit and scope of the present invention. The emitter of transistor 112 is connected to one terminal 118, which functions as the coil of magnetic trip switch. The collector terminal of NPN transistor 112 is connected to one terminal of tripping electret 116 with the remaining terminal of tripping electret 116 connected to the remaining terminal of the coil 118. The emitter of NPN transistor 112 is also connected to hot lead 10 inside the handheld device itself. Thus, the operation of the cartridge 110 can be ascertained from FIG. 5. Moisture present during a hazardous condition completes a circuit between the base-emitter path of the transistor and the sensing electret 114. The resulting signal sent to the base of the NPN transistor 112 causes the transistor 112 to conduct, which allows tripping electret 116 to energize the coil 118 and thereby disconnect the handheld device 10 from the line cord 16. An actuating bar 120 disconnects contact arms 122 from contacts 124 during energization of the coil 118 during an electrical hazard. A reset aperature 126 is axially disposed from actuating bar 120 and is an optional item which may be used to reset the device when tripped similar to the reset aperature 44 of FIG. 1. Aperture 126 is preferably sealed by a seal 129 which is adjacent to sealing plug 130 disposed in the housing of the hand held electrical device 10. Therefore, reset of the tripped cartridge 110 may be accomplished by removal of plug 130 and the insertion of a reset tool as described above. Accordingly, the seal 129 covering aperture 126 may be replaceable or a "self sealing" type.

A plurality of termination or terminating points 128 are utilized to interconnect the safety cartridge 110 with the different electrical contact points inside the hair dryer 10. It is to be understood, however, that these terminations 128 should be internal to the safety cartridge 110, thereby minimizing the chances of electrical short between them in the event of an electrically hazardous condition. Accordingly, each terminating point 128 is preferably hermetically sealed in the form of plugs which can be molded into place similar to reset aperature 126 and 132. Similarly, seal 132 hermetically seals the joint between the cartridge 110 and cord 16. However, any arrangement which prohibits the introduction of extraneous matter into the electrical connection is acceptable, such as waterproof type connectors which are readily available and known to one skilled in the art. Similarly, with respect to electric cord and plug 16 and 18 respectfully, the entire safety cartridge 110 is preferably sold with the cord and plug 16, 18 attached thereto or electrical connection may be thereafter made by the manufacturer or assembler of the hair dryer 10.

It is to be understood that although only several variations of electronic components are shown, other variations may be utilized without departing from the spirit and scope of the present invention. For example, a standard ground fault interrupter circuit such as LM1851 Ground Fault Interrupter produced by National Semiconductor Corporation which are readily available and known to one skilled in the art may be utilized. Additionally, other types of mechanical interlocks may be utilized without departing from the spirit and scope of the present invention. Further, current interruption may be accomplished by replacing the electronic components and/or mechanical interrupt with other suitable current interrupting devices, such as, for example, high current transistors, latching relays, opto-isolators, and the like.

Accordingly, the present invention produces an extremely safe device for individuals to utilize which encompasses a present design without the need for retooling and the like. Additionally, the present invention adds minimal cost while substantially increasing the safety of handheld devices such as hair dryers and the like. Further, the present invention may be encompassed into other small appliances, such as, mixers, blenders, and other kitchen-type aids and electrical tools in general.

Having thus described the present invention in detail, it is to be understood that the foregoing description is not intended to limit the spirit and scope thereof. What is desired to be protected by Letters Patent is set forth in the appended claims.

What is claimed is:

1. A safety cartridge adapted for use in an electrical device having a first electrical path for connecting a load to an Ac power supply and having an alternate ground path therein, comprising:
    safety device means for detecting the flow of current through the alternate ground path, and interrupting the flow of electrical current in the first electrical path in response to detecting current in the alternate ground path, said safety device means being operated by a power supply independent of the AC power supply; and
    mounting means for detachably mounting said safety device means within said electrical device and withdrawing said safety device therefrom, said mounting means including electrical connecting means to connect said safety device means to the first electrical path and alternate ground path, respectively.

2. A device according to claim 1, wherein said safety device means includes detection means for detecting current flowing from the first electrical path to the alternate ground path, and for producing an electrical signal proportionate to the current flowing through the alternate ground path; and
    current interruption means for interrupting the first electrical path in response to the electrical signal produced by said detection means exceeding a predetermined value.

3. A device according to claim 2, wherein said detection means includes first electrical storage means for providing a source of operating potential to said current interruption means, second electrical storage means for providing current through said alternate ground path whenever said ground path is electrically connected to said first electrical path, and gating means responsive to the current provided by said second electrical storage means and operative for electrically connecting said first electrical storage means to said current interruption means.

4. A safety cartridge according to claim 2, the first electrical path including a power line connected to the load, said mounting means being located between the load and the power line, wherein said connecting means includes first electrical connectors for connecting said current interruption means between the load and the power line, and second electrical connectors for connecting said detection means to said alternate ground path.

5. A device according to claim 3 wherein said gating means is comprised of a transistor.

6. A device according to claim 3 wherein said first and second electrical storage means are comprised of electrets.

7. A device according to claim 1 wherein said safety device means is hermetically sealed.

8. A safety device adapted for use in an electrical device having a load connected to an AC power supply by a first electrical path, comprising:
    ground plane means disposed within said electrical device for providing an electrical ground path other than the first electrical path;
    electrical storage means for providing current through said ground plane means whenever said first electrical path is electrically connected to said ground plane means;
    current interruption means disposed within said electrical device for electrically disconnecting the AC power supply from the first electrical path, said current interruption means including a solenoid;
    a first electret for providing a source of operating potential to said solenoid, said first electret being independent of the AC power supply; and
    switching means responsive to the current provided by said electrical storage means for electrically connecting said first electret to said solenoid such that said first electret energizes said solenoid, thereby causing said first electrical path to be interrupted, whereby the AC power supply is electrical isolated from the first electrical path.

9. A device according to claim 8, wherein said ground plane means is produced by plating the interior of said electrical device with an electrically conductive material.

10. A device according to claim 8, wherein said ground plane means is comprised of a metal foil conformably disposed in the interior of said electrical device.

11. A device according to claim 8, wherein said ground plane means is connected to any exposed electrically conductive parts in said electrical device.

12. A device according to claim 8, wherein said switching means is comprised of an FET having its gate connected to said electrical storage means, and its drain-source path connected serially between said current interruption means and said electret.

13. A device according to claim 8, wherein said electrical storage means includes a condenser.

14. A device according to claim 8, wherein said current interruption means includes a solenoid operatively connected to spring biased contacts, said spring biased contacts being movable between a first position and a second position for respectively permitting and interrupting the flow of electrical current to along the first electrical path.

15. A device according to claim 14, further comprising a reset means operatively connected to said current interruption means for reestablishing the first electrical path in said electrical device.

16. A device according to claim 15, further comprising an aperture disposed within said electrical device adjacent to said reset means, said aperture permitting the insertion therethrough of a reset key adjacent to said solenoid for reestablishing the first electrical path in said electrical device.

17. A device according to claim 15, further comprising an aperture in a portion of said solenoid adjacent to said reset means, said aperture permitting the insertion therethrough of a reset key for reestablishing the first electrical path in said electrical device.

18. A device according to claim 8, wherein said electrical storage means is a second electret.

19. A device according to claim 8, wherein said electrical storage means is a battery.

20. A device according to claim 8, said electrical storage means having a first terminal connected to said ground plane means, and a second terminal, wherein said switching means is bipolar transistor having its base terminal connected to said second terminal of said electrical storage means, and its collector-emitter path connected between said first electret and said solenoid, said emitter terminal also being connected to the first electrical path.

21. A device according to claim 8, further including a mounting means for detachably mounting said safety device within said electrical device such that said safety device means can be inserted into said electrical device and withdrawn therefrom, said mounting means including electrical connecting means to connect said safety device to the first electrical path and said ground plane means, respectively.

22. A safety device for an electrical device having a load connected to an AC power supply by a first electrical path, comprising:

ground plane means disposed within said electrical device for providing a ground path;

current interruption means disposed within said electrical device for interrupting the first electrical path in said electrical device, said current interruption means including a solenoid that is operatively connected to spring-biased contacts, said spring-biased contacts being movable between a first position and a second position for respectively permitting and interrupting the flow of electrical current to the load in said safety device;

biasing means disposed within said electrical device for operating said current interruption means, said biasing means including first electrical storage means for providing a source of operating potential to said solenoid, second electrical storage means for providing current through said ground plane means when said ground plane means is electrically connected to said first electrical path, and switching means responsive to the current provided by said second electrical storage means for electrically connecting said first electrical storage means to said solenoid, whereby said spring-biased contacts are moved from their first position to their second position, causing the first electrical path to be disconnected; and reset means operatively connected to said solenoid for moving said spring-biased contacts from their second position to their first position, a reset key for actuating said reset means, and an aperture disposed in said electrical device adjacent to said reset means for permitting the insertion therethrough of said reset key, whereby the first electrical path in said electrical device is reestablished by inserting said reset key through said aperture.

* * * * *